United States Patent
Behr

(10) Patent No.: US 11,441,950 B2
(45) Date of Patent: Sep. 13, 2022

(54) APPARATUS AND METHOD FOR REDUCING INTERFERENCE IN AN OPTICAL SPECTROSCOPY PROBE HAVING A COLLIMATED SAMPLE BEAM

(71) Applicant: Tornado Spectral Systems Inc., Mississauga (CA)

(72) Inventor: Bradford B. Behr, Silver Spring, MD (US)

(73) Assignee: Tornado Spectral Systems Inc., Mississauga (CA)

( * ) Notice: Subject to any disclaimer, the term of this patent is extended or adjusted under 35 U.S.C. 154(b) by 0 days.

(21) Appl. No.: 17/137,038

(22) Filed: Dec. 29, 2020

(65) Prior Publication Data
US 2021/0199504 A1 Jul. 1, 2021

Related U.S. Application Data

(60) Provisional application No. 62/955,826, filed on Dec. 31, 2019.

(51) Int. Cl.
*G01J 3/45* (2006.01)

(52) U.S. Cl.
CPC ...................... *G01J 3/45* (2013.01)

(58) Field of Classification Search
None
See application file for complete search history.

(56) References Cited

U.S. PATENT DOCUMENTS

| | | | |
|---|---|---|---|
| 5,112,127 A | 5/1992 | Carrabba et al. | |
| 5,377,004 A | 12/1994 | Owen et al. | |
| 5,712,703 A * | 1/1998 | Ando | G01J 3/02 356/300 |
| 5,911,017 A | 6/1999 | Wach et al. | |
| 5,974,211 A | 10/1999 | Slater | |
| 6,310,686 B1 | 10/2001 | Jiang | |
| 6,483,581 B1 | 11/2002 | Ben-Amotz et al. | |
| 6,603,545 B2 | 8/2003 | Slater | |
| 6,831,745 B2 | 12/2004 | Marquardt et al. | |
| 6,977,729 B2 | 12/2005 | Marquardt et al. | |

(Continued)

FOREIGN PATENT DOCUMENTS

WO 2021/134129 A1 7/2021

OTHER PUBLICATIONS

Stevens et al., "Miniature standoff Raman probe for neurosurgical applications", J. Biomed. Opt., 2016, 21(8):087002-1 to 087002-6.

(Continued)

*Primary Examiner* — Shawn Decenzo
(74) *Attorney, Agent, or Firm* — Bereskin & Parr LLP/S.E.N.C.R.L., s.r.l.; Tony Orsi

(57) ABSTRACT

Various embodiments are provided herein for an optical spectroscopy probe which generally includes a probe head having optical elements for coupling to an excitation fiber for receiving laser energy therefrom and generating a collimated excitation light beam; and a sample optic adjacent to the probe head, the sample optic having at least one optical element with two non-parallel surfaces to receive the collimated excitation light beam, to transmit the collimated excitation light beam to a sample, and to collect at least one afocal returning scattered light beam that is reflected from the sample.

18 Claims, 6 Drawing Sheets

(56) References Cited

U.S. PATENT DOCUMENTS

| | | | |
|---|---|---|---|
| 7,148,963 B2 | 12/2006 | Owen et al. | |
| 7,385,692 B1* | 6/2008 | Nguyen | G01J 3/02 356/301 |
| 7,502,105 B2 | 3/2009 | Lee et al. | |
| 7,518,725 B1* | 4/2009 | Liphardt | G01J 3/02 356/364 |
| 7,692,786 B2 | 4/2010 | Tedesco et al. | |
| 9,554,743 B2* | 1/2017 | Sarfaty | G01N 21/658 |
| 2006/0114457 A1* | 6/2006 | Schmitz | G01J 3/10 356/319 |
| 2007/0024847 A1* | 2/2007 | Zambuto | G01J 3/0291 356/300 |
| 2007/0188855 A1* | 8/2007 | Shishkov | G01J 3/02 359/362 |
| 2008/0039696 A1* | 2/2008 | Kamihara | A61B 1/05 600/181 |
| 2008/0088837 A1* | 4/2008 | Gardner, Jr. | G01J 3/28 356/301 |
| 2009/0033928 A1* | 2/2009 | Azimi | G01J 3/0218 356/301 |
| 2009/0323057 A1* | 12/2009 | Chen | G01J 3/44 356/301 |
| 2010/0114514 A1* | 5/2010 | Wang | G01J 3/0264 702/82 |
| 2012/0327409 A1* | 12/2012 | Behr | G01J 3/0205 356/302 |
| 2015/0055137 A1* | 2/2015 | Brown | G01B 9/02091 356/479 |
| 2015/0377701 A1* | 12/2015 | Pawluczyk | G01J 3/0243 356/301 |
| 2016/0084763 A1* | 3/2016 | de Boer | G01J 3/0218 250/459.1 |
| 2017/0322133 A1* | 11/2017 | Trainer | G01N 15/0211 |
| 2018/0017806 A1* | 1/2018 | Wang | G01B 9/02044 |
| 2018/0062344 A1* | 3/2018 | Smith | A61F 9/008 |
| 2020/0173854 A1* | 6/2020 | Munro | G01J 3/0208 |

OTHER PUBLICATIONS

International Search Report and Written Opinion dated Mar. 18, 2021 in International Patent Application No. PCT/CA2020/051804 (9 pages).

Utzinger et al., "Fiber Optic Probes for Biomedical Optical Spectroscopy", Journal of Biomedical Optics, 2003, 8(1):121-147.

Lewis et al., "Raman Spectrometry with Fiber-Optic Sampling", Focal Point, 1996, 50(10): 12A-30A.

* cited by examiner

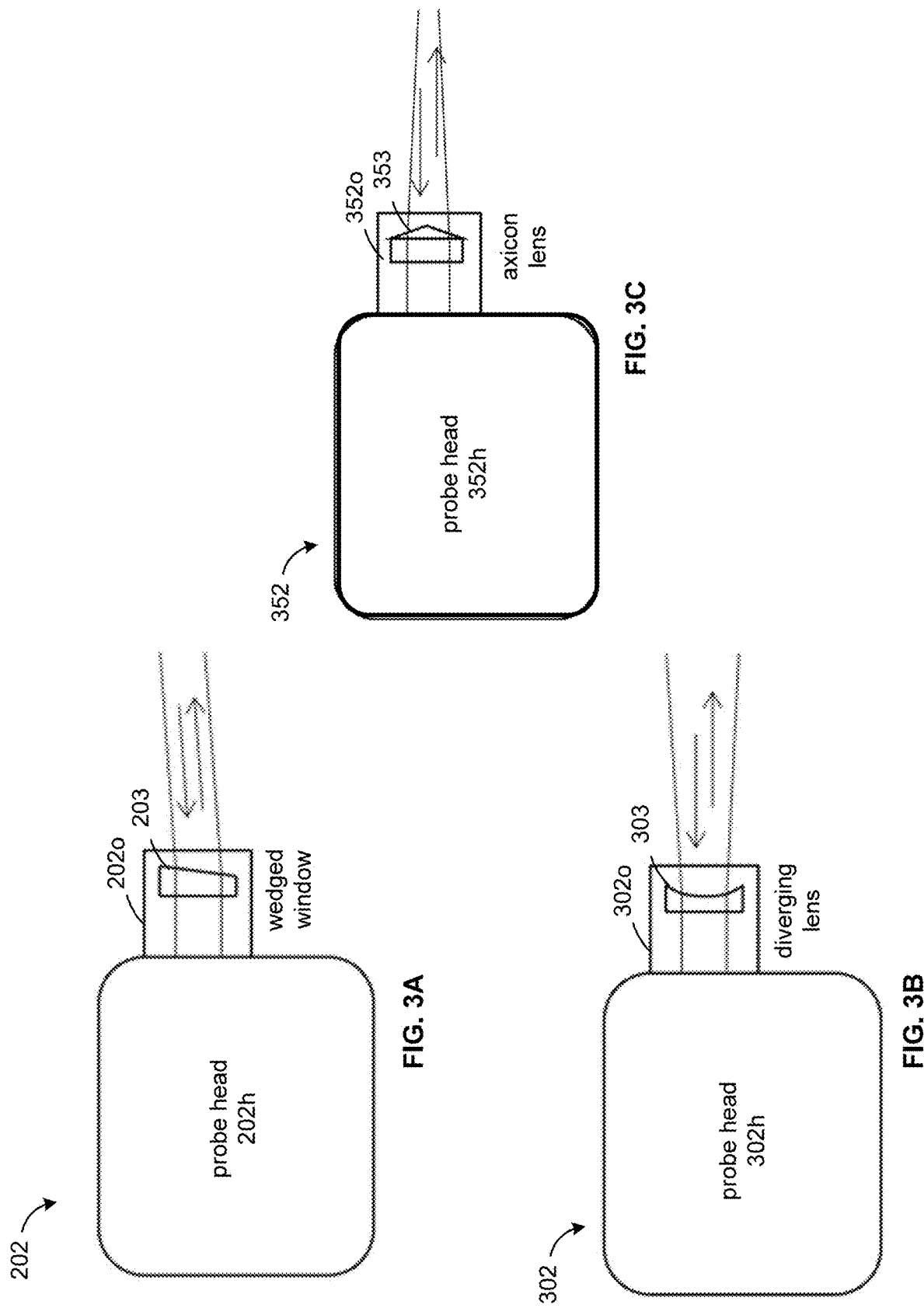

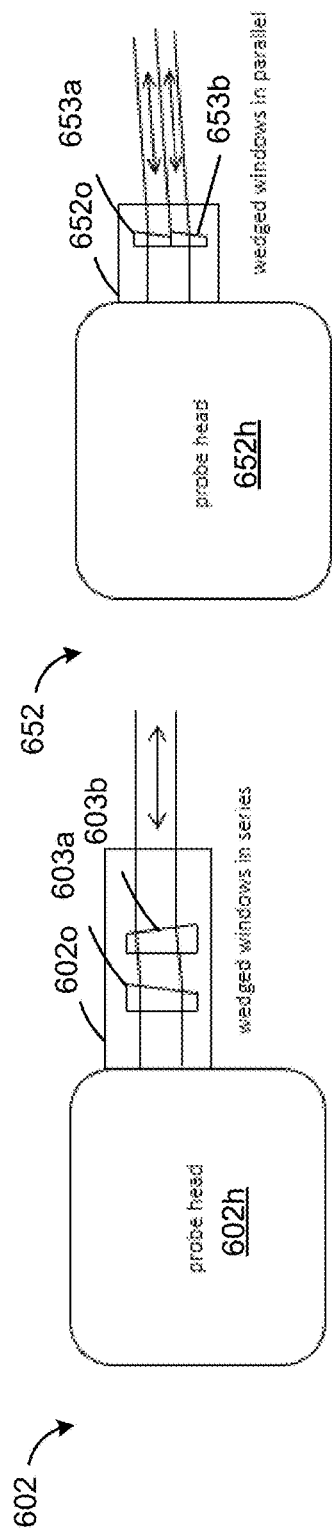
FIG. 5A
FIG. 5B
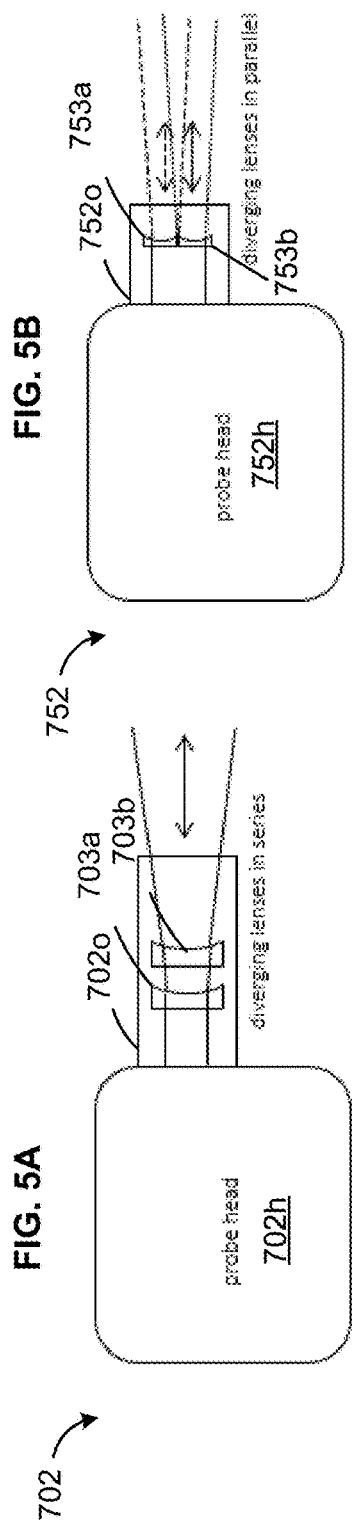
FIG. 5C
FIG. 5D
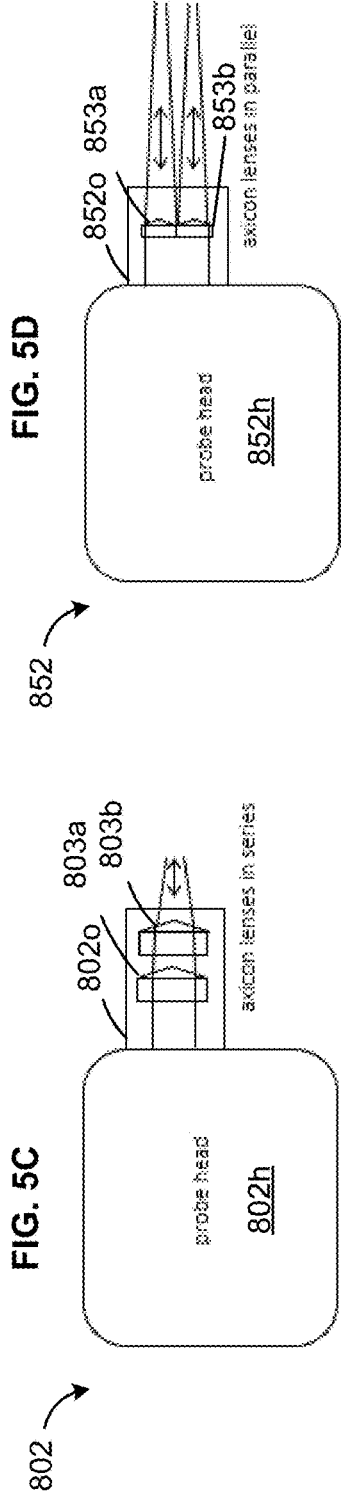
FIG. 5E
FIG. 5F

APPARATUS AND METHOD FOR REDUCING INTERFERENCE IN AN OPTICAL SPECTROSCOPY PROBE HAVING A COLLIMATED SAMPLE BEAM

CROSS-REFERENCE TO RELATED APPLICATION

This application claims the benefit of U.S. Provisional Patent Application No. 62/955,856 filed Dec. 31, 2019 and the entire contents of U.S. Provisional Patent Application No. 62/955,856 are hereby incorporated herein in its entirety.

FIELD

Various embodiments are described herein that generally relate to the field of optical spectroscopy and more specifically relates to the components of an optical spectroscopy sample probe which illuminates a sample with a laser beam and collects light scattered back from the sample.

BACKGROUND

Raman spectroscopy is an analytical method wherein a laser beam, containing laser photons having a certain wavelength, is used to illuminate a sample, which may be in a solid, crystalline, liquid, or gaseous form, and a small fraction of the laser photons shift to different wavelengths as they scatter from the molecules of the sample. The amount of wavelength shift depends on the structure of the sample molecules. Therefore, different types of sample molecules will generate different spectral patterns in the scattered light from the sample, which can be analyzed to identify and quantify the chemical composition of the sample. However, the Raman scattering effect is very weak so the wavelength-shifted signal is usually quite faint. As such, it is advantageous to collect as much of the scattered light from the sample as possible, while also illuminating a large enough area or volume of the sample such that the spectroscopic analysis results are representative of the whole sample.

Most commercially available Raman systems use focusing optics to concentrate the laser beam onto a small region of the sample, which can increase the detectable Raman signal but also creates some negative impacts, such as increasing the possibility of damaging the sample via laser heating, measuring the sample only at one small region which may not be representative of the whole sample, and adding a requirement that the sample be positioned in the correct location relative to the optical focal point.

SUMMARY OF VARIOUS EMBODIMENTS

According to one aspect of the teachings herein, there is provided an optical spectroscopy probe comprising: a probe head having optical elements for coupling to an excitation fiber for receiving laser energy therefrom and generating a collimated excitation light beam; and a sample optic adjacent to the probe head, the sample optic having at least one optical element with two non-parallel surfaces to receive the collimated excitation light beam, to transmit the collimated excitation light beam to a sample, and to collect at least one afocal returning scattered light beam that is reflected from the sample.

In at least one embodiment, the at least one optical element comprises at least one wedged window that is disposed between the probe head and the sample and has two surfaces that are tilted with respect to one another to transmit a substantially collimated excitation light beam to the sample and receive at least one substantially collimated afocal returning scattered light beam without inducing an interferometric fringing or etaloning pattern in a resulting spectrum that is generated from the at least one substantially collimated afocal returning scattered light beam that is reflected from the sample.

In at least one embodiment, the at least one optical element comprises a plurality of wedged windows arranged in a serial or parallel configuration.

In at least one embodiment, the at least one optical element comprises at least one diverging lens that is disposed between the probe head and the sample, the at least one optical element having one or more non-planar surfaces that are adapted to cause the collimated excitation light beam to diverge during transmission to the sample and receive the at least one afocal returning scattered light beam thereby preventing an interferometric fringing/etaloning pattern in a resulting spectrum that is generated from the at least one afocal returning scattered light beam that is reflected from the sample.

In at least one embodiment, the at least one optical element comprises a plurality of diverging lenses that are arranged in a serial or parallel configuration.

In at least one embodiment, the at least one optical element is at least one axicon lens disposed between the probe head and the sample, the at least one axicon lens having one or more conical surfaces that are adapted to cause the collimated excitation light beam to converge afocally during transmission to the sample and receive the at least one afocal returning scattered light beam thereby preventing an interferometric fringing/etaloning pattern in a resulting spectrum that is generated from the at least one afocal returning scattered light beam that is reflected from the sample.

In at least one embodiment, the at least one optical element comprises a plurality of axicon lenses arranged in a serial or parallel configuration.

In at least one embodiment, the at least one optical element comprises a combination of one or more wedged windows, one or more diverging lenses and one or more axicon lenses, the at least one optical element having one or more surfaces that are adapted to cause the collimated excitation light beam to converge afocally during transmission to the sample and receive the at least one afocal returning scattered light beam thereby preventing an interferometric fringing/etaloning pattern in a resulting spectrum that is generated from the at least one afocal returning scattered light beam that is reflected from the sample.

In at least one embodiment, the sample optic comprises a reimager having first and second optical elements disposed on either side of a spatial filter, the spatial filter being disposed at an intermediate focal point thereby preventing off-axis light from entering the probe head and contaminating a resulting spectrum that is generated from a substantially collimated afocal returning scattered light beam that is reflected from the sample.

In at least one embodiment, the first and second optical elements are spaced apart from the spatial filter and have focal lengths to provide the reimager with a reimaging ratio of 1:1.

In at least one embodiment, the first and second optical elements are spaced apart from the spatial filter and having focal lengths to provide the reimager with a reimaging ratio that is: (a) greater than 1:1 to increase a diameter of the collimated excitation beam at the sample or (b) smaller than 1:1 to decrease a diameter of the collimated excitation beam at the sample.

In at least one embodiment, at least one of the first and second optical elements are lenses.

In at least one embodiment, at least one of the first and second optical elements are cylindrical or toroidal lenses to reshape the collimated excitation beam along one axis relative to a perpendicular axis.

In at least one embodiment, at least one of the optical elements is a curved mirror, an anamorphic prism, or another optical element which acts as a lens and causes the collimated excitation beam to change shape, change direction, or to diverge or converge.

In at least one embodiment, the sample optic is contained within an enclosure that provides a sealed volume for the sample optic and contains at least one gas with spectral lines or bands in a spectrometer spectral range for use as a spectral calibration reference.

In at least one embodiment, the sample optic is contained within an enclosure that provides a sealed volume for the sample optic and contains at least one gas with no spectral lines or bands in a spectrometer spectral range to prevent interference with spectral measurement of the sample.

In at least one embodiment, the sample optic is contained within an enclosure that provides a sealed volume for the sample optic and contains a low-density gas or an effective vacuum to prevent interference with spectral measurement of the sample.

In another aspect, in accordance with the teachings herein, there is provided an optical spectroscopy probe comprising: a probe head having optical elements for coupling to an excitation fiber for receiving laser energy therefrom and generating a collimated excitation light beam; and a sample optic adjacent to the probe head, the sample optic having at least one optical element that is adapted to receive the collimated excitation light beam, to transmit the collimated excitation light beam to a sample, and to collect at least one afocal returning scattered light beam that is reflected from the sample, wherein the at least one optical element has two surfaces that are arranged so that the at least one optical element does not inherently act as a resonant cavity for the collimated excitation or the at least one afocal returning scattered light beam.

In at least one embodiment, the probe is further defined in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 3A illustrates an example embodiment of a probe head with a sample optic comprising a wedged window which permits collimated beams of light to exit and enter the probe head without inducing interferometric etaloning.

FIG. 3B illustrates an example embodiment of a probe head with a sample optic comprising a weakly diverging lens which permits beams of light to exit and enter the probe head without inducing interferometric etaloning.

FIG. 3C illustrates an example embodiment of a probe head with a sample optic comprising an axicon lens which permits beams of light to exit and enter the probe head without inducing interferometric etaloning.

FIG. 5A illustrates an example embodiment of a probe head with a sample optic comprising two wedged windows arranged in a series configuration.

FIG. 5B illustrates an example embodiment of a probe head with a sample optic comprising two wedged windows arranged in a parallel configuration.

FIG. 5C illustrates an example embodiment of a probe head with a sample optic comprising two diverging lenses arranged in a series configuration.

FIG. 5D illustrates an example embodiment of a probe head with a sample optic comprising two diverging lenses arranged in a parallel configuration.

FIG. 5E illustrates an example embodiment of a probe head with a sample optic comprising two axicon lenses arranged in a series configuration.

FIG. 5F illustrates an example embodiment of a probe head with a sample optic comprising two axicon lenses arranged in a parallel configuration.

Figure 1:
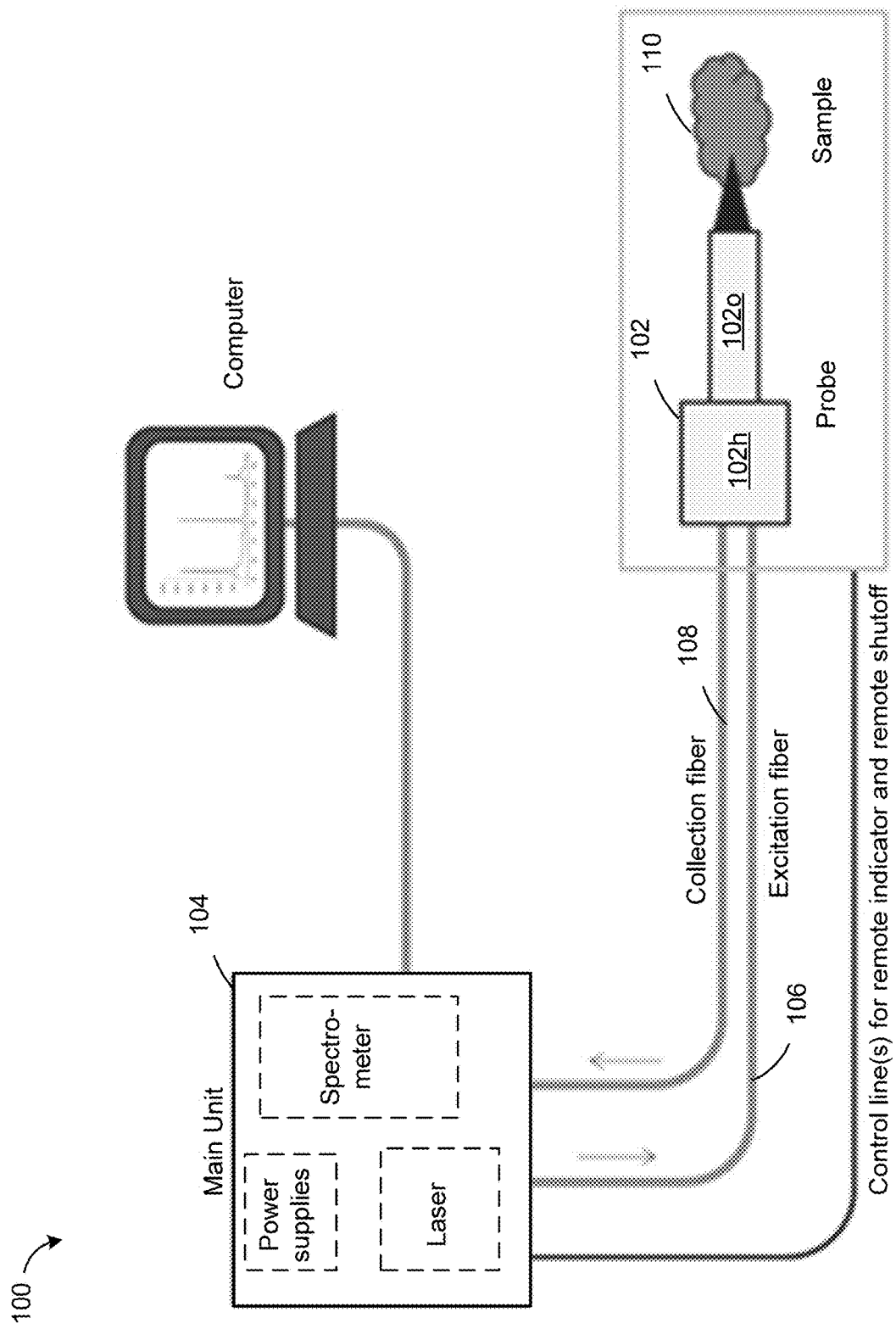
FIG. 1 shows a representative Raman spectroscopy system, illustrating the relationships among a main analyzer unit (containing a laser, a spectrometer, and power supplies), a probe, and a control computer.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical, optical or electrical connotation. For example, as used herein, the terms coupled or coupling can indicate that two elements or devices can be directly connected to one another or connected to one another through one or more intermediate elements or devices via an electrical signal, an electrical connection, a mechanical element, an optical element, or a light pathway depending on the particular context.

It should also be noted that, as used herein, the wording "and/or" is intended to represent an inclusive-or. That is, expressions such as "X and/or Y" are intended to generally mean X or Y or both, for example. As a further example, expressions such as "X, Y, and/or Z" are intended to generally mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

In one aspect, the present teachings provide novel concepts in the implementation of a Raman "probe", which is the optical and mechanical subsystem of a Raman analyzer system that interfaces with a sample under study. In many Raman analyzer systems (such as Raman system 100 illustrated in FIG. 1), a probe 102 is connected to a main analyzer unit 104 via multiple optical fiber cables: one or more "excitation fibers" 106 for transmitting laser energy from the analyzer unit 104 to the probe 102 and one or more "collection fibers" 108 for transmitting the scattered light signal collected by the probe 102 from a sample 110 back to the analyzer unit 104.

Figure 2:
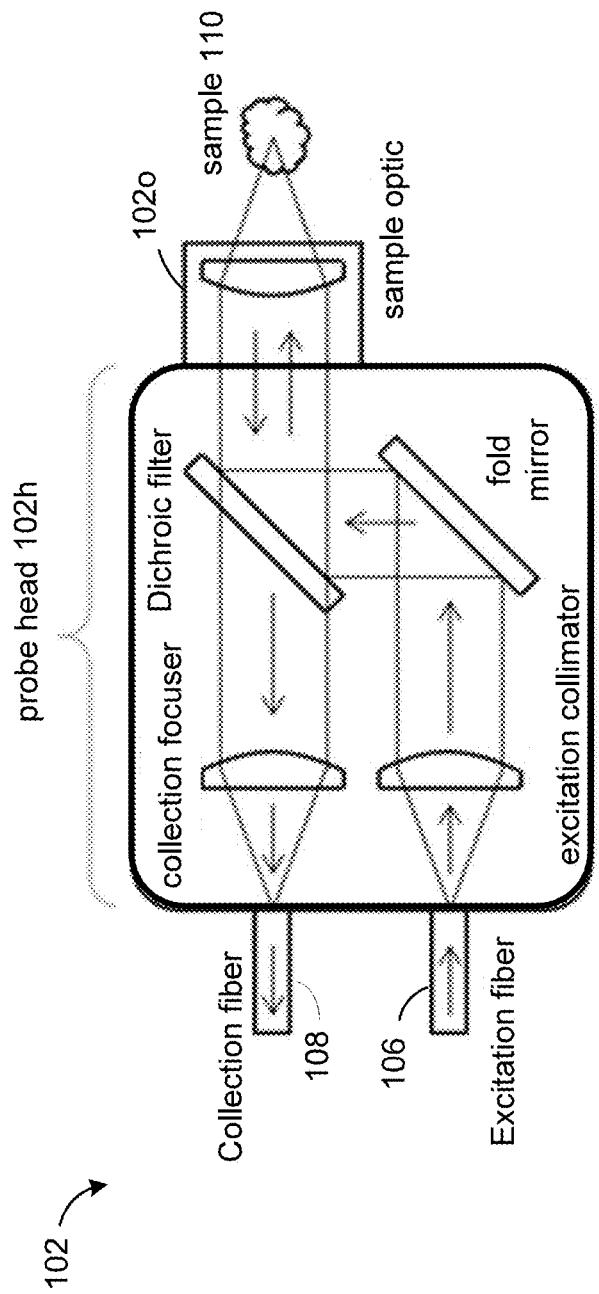
FIG. 2 is an illustration of a typical probe head and a sample optic configuration.

The probe 102 is further divided into two broad parts, the "probe head" 102*h* and the "sample optic" 102*o*, as shown in FIG. 2. The probe head 102*h* typically contains optical elements for collimating a diverging laser light beam that is provided from the excitation fiber 106 and directing this collimated beam to the sample optic 102*o*, which in this example is an excitation collimator and a fold mirror. Other optical elements within the probe head 102*h* include a dichroic filter for receiving and filtering at least one collimated beam of scattered light returning from the sample optic 102*o* to remove non-Raman-scattered light, and a collection focuser which then focuses the filtered scattered return light down into the collection fiber 108.

For the sample optic 102*o* (also sometimes referred to as the objective optic or non-contact optic), current state-of-the-art typically entails a single plano-convex or biconvex lens. In these types of Raman probe sample optics, the lenses have one or more surfaces which are parts of a sphere, or a lens which is a complete sphere. Such optical elements are called "spherical optics" by those skilled in the art, even when the optical elements do not comprise a complete sphere.

For some spectroscopic measurement applications, it is advantageous for the excitation light to illuminate a relatively large area or volume of the sample 110. This goal may be embodied by removing the focusing sample optic altogether such that the sample 110 is illuminated directly by the collimated excitation light beam, and some of this light is back-scattered from the sample 110 to create substantially collimated afocal returning scattered light beams which travel back into the probe head and at least one of these returning beams is focused by the internal optics of probe head 102*h* on to the collection fiber 108. All other light beams scattered from the sample 110 are absorbed or reflected elsewhere and thus are not transmitted by the collection fiber 108 to the analyzer spectrometer for measurement. Although this optical configuration typically cannot capture as much of the backscattered light from the sample 110 as a focused spectroscopy probe could, the larger area (for an opaque sample) or larger volume (for a transparent sample) of the sample 110 being illuminated means that a spectroscopy analyzer system that analyzes the backscattered light is getting a more representative view of the sample 110 as a whole, rather than focusing in on a small and potentially non-representative region of the sample 110.

Furthermore, a collimated excitation beam by definition has no focal point or focal plane, so the backscattered light from the sample 110 will be substantially constant over a large range of working distance, which is the linear distance between the sample 110 and the surface of the sample optic 102*o* that is closest to the sample 110. With a focusing spectroscopic probe, on the other hand, the spectroscopic signal, i.e. a portion of the backscattered light from the sample 110 that is collected by the probe and sent back to the spectrometer, will vary significantly as the position of the sample 110 is changed. In such cases, when the sample 110 is at the focal point of the sample optic 102*o*, the signal strength will typically be at a maximum, while moving the sample 110 in any direction away from the focal point of the sample optic 102*o* will decrease the amount of measured signal. This aspect of a focusing sample optic can be highly problematic when making spectroscopic measurements of solid samples with a rough or irregular surface, solid samples in powder, pellet, or bead form, or any other scenario where the excitation beam does not intersect the sample 110 at a stationary location. In such situations, it is known to those skilled in the art that a collimated excitation beam can provide a much more consistent and reliable measurement of the sample 110, because the collimated excitation beam maintains substantially the same size and illumination pattern on the sample 110 regardless of the distance between the probe 102 and the sample 110, and thus the spectroscopic signal does not change significantly as the sample 110 changes position.

The outgoing collimated excitation beam and the at least one incoming substantially collimated afocal returning scattered light beams (i.e. collection beams) may travel directly between the probe head 102h and the sample 110 without any intervening optical elements, but in many real-world environments an optical window or other protective surface is used to prevent sample or contaminants from traveling inside the probe head 102h and negatively affecting the optical elements contained within the probe head 102h. However, a flat window with parallel faces can act as a resonant cavity, akin to a Fabry-Perot etalon, such that some wavelengths of the excitation beam or collection beam are transmitted more efficiently than other wavelengths.

An etalon has two reflecting glass plates and is used to measure small differences in the wavelength of light based on the interference that it produces, which can provide useful analysis capability in some optical measurement situations, but which is deleterious for Raman spectroscopy. Even with anti-reflection coatings on one or both surfaces of the optical window, this etaloning or "fringing" phenomenon will induce periodic ripples in the transmitted spectrum of the excitation beam or the measured spectrum of the collection beam, complicating the interpretation of the spectral data.

To prevent this deleterious effect, at least one optical element is used, in accordance with the teachings herein, which does not inherently act as a resonant cavity for an outgoing or incoming collimated beam. Referring now to FIG. 3A, shown therein is one example embodiment of a probe 202 with a sample optic 202o that includes a wedged window 203 with substantially flat front and back surfaces that are deliberately manufactured at an angle to each other, such that these surfaces are not parallel to one another. Internal reflections of the collimated excitation beam from the two surfaces of the wedged window 203 will be tilted at an angle relative to the initial collimated excitation beam, and any interferometric fringes will tend to average out over the diameter of the collimated excitation beam. Similarly, internal reflections of at least one of the returning substantially collimated afocal scattered light beams (i.e. the collection beam reflected by the sample 110) from the two surfaces of the wedged window 203 will be tilted at an angle relative to the initial collection beam, and any interferometric fringes will tend to average out over the diameter of the collection beam. The wedged window 203 will typically be larger than the collimated excitation beam (which may also be referred to as a sample beam) to permit the collimated sample beam to pass therethrough without being partially blocked, and the wedged window 203 can vary in thickness from being thin (about <1 mm), thick (about >20 mm), or some intermediate thickness depending on temperature, pressure, or other characteristics of the sample 110. For example, a wedged window that is thicker will be stronger and thus be able to resist higher pressure or it will have a greater thermal resistance to protect the rest of the probe head from high temperature samples. The probe itself may also be implemented with a different thickness window depending on the temperature, pressure, and other characteristics of the sample/measurement environment that the probe is expected to be exposed to.

Surface flatness of the surfaces of the wedged window 203 is not critical, but surface variations less than 1 wavelength of the collimated light beam are typically preferred for optical components. The wedge angle (i.e., the angle between the front and rear surfaces of the wedged window 203) is preferably large enough to reduce the interferometric effects, typically about 0.25 to 2.0 degrees, although other angles are possible depending upon the requirements of the measurement scenario. Very large wedge angles may cause a difference in the dispersion angle between the collimated sample beam and at least one of the substantially collimated afocal returning scattered light beams, but this effect will be minimal in most cases. Other embodiments may utilize two or more wedged windows in parallel or in series if these configurations are advantageous for a specific measurement scenario. For example, as shown in FIG. 5A, when wedged windows 603a, 603b are arranged in series, there are no harsh alignment requirements other than to make sure that the wedged windows 603a, 603b are arranged such that the excitation beam and at least one of the returning collection beams travel through each of the wedged windows 603a, 603b in turn, and that none of the multiple window surfaces are substantially parallel with any others, or else interferometric fringing may result. As another example, as shown in FIG. 5B, when wedged windows 653a, 653b are arranged in parallel, there may be two or more wedged windows 653a, 653b that are placed side-by-side, so that each of the wedged windows 653a, 653b permits a portion of the sample beam or at least one of the returning light beams to pass through it. In FIGS. 5A and 5B, like numbers to FIG. 3A, incremented by 400 and 450, respectively, are used to denote like elements.

Referring now to FIG. 3B, shown therein is another example embodiment of a probe 302 with a sample optic 302o that includes a window having one or more curved surfaces that cause the collimated sample beam to diverge slightly as it propagates towards the sample 110. In this example embodiment, the window may be referred to as a diverging lens 303. The curvature of at least one the diverging lens surfaces is preferably large enough to prevent interferometric effects, but small enough to prevent the collimated sample beam from diverging excessively over a range of different sample positions that are anticipated in normal usage. For example, the diverging lens 303 may have a surface radius of curvature of 100 mm for a range of sample positions that are between 0 and 50 mm from the sample optic 302o to the sample 110. Alternatively, multiple diverging lenses can also be used, either in series or in parallel for the sample optic 302o. In such alternative embodiments, as shown in FIGS. 5C and 5D, respectively, the arrangement of the diverging lenses in the series and parallel configurations is as described for the series and parallel configurations of the wedged windows. In FIGS. 5C and 5D, like numbers to FIG. 3B, incremented by 400 and 450, respectively, are used to denote like elements.

Referring now to FIG. 3C, shown therein is another example embodiment of a probe head 352 with a sample optic 352o that includes a window having one or more conical surfaces, known to those skilled in the art as an "axicon lens" 353. The axicon lens 353 can be considered as another type of wedged window where the wedge is rotationally symmetric around the axis along which the collimated excitation beam is propagating. Accordingly, the axicon lens 353 has a cone shape. After passing through the axicon lens 353, the substantially collimated excitation beam will no longer be considered collimated, as the light rays are refracted by the axicon surfaces into a plurality of non-parallel directions, but the excitation beam that has passed through the axicon lens 353, and travels towards the sample 110, is still afocal as it will not converge to make an image of the source. The conical surface(s) of the axicon lens 353 will prevent coherent internal reflections from creating an etaloning effect as internal reflections will result in portions of the reflected beams (from either the substantially collimated excitation beam or at least one of the afocal returning collection beams scattered from the sample 110) going in a plurality of different directions. By way of example, the axicon lens 303 may have an internal angle (the angle measured between one side of the cone and the other side of the cone) of about 179.9 to 90 degrees, depending on an expected distance between the distal end of the probe head 352 (that is closest to the sample 110) and the position of the sample 110. Although the axicon window or lens 353 may cause the collimated sample beam to converge, a focused image of the light source (i.e., the excitation optical fiber) is not formed by this optical configuration, and the advantages of an afocal excitation beam are maintained. In some embodiments, as shown in FIGS. 5E and 5F, respectively, multiple axicon lenses may be used in series or in parallel. In such alternative embodiments, the arrangement of the axicon lenses in the series and parallel configurations is as described for the series and parallel configurations of the wedged windows. In FIGS. 5E and 5F, like numbers to FIG. 3C, incremented by 450 and 500, respectively, are used to denote like elements.

Figure 6A:
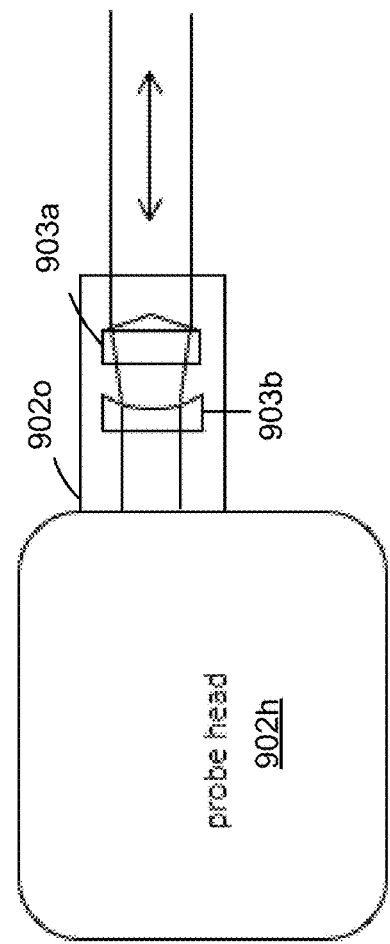
FIG. 6A illustrates an example embodiment of a probe head with a sample optic comprising a combination of different windows arranged in a series configuration.
Figure 6B:
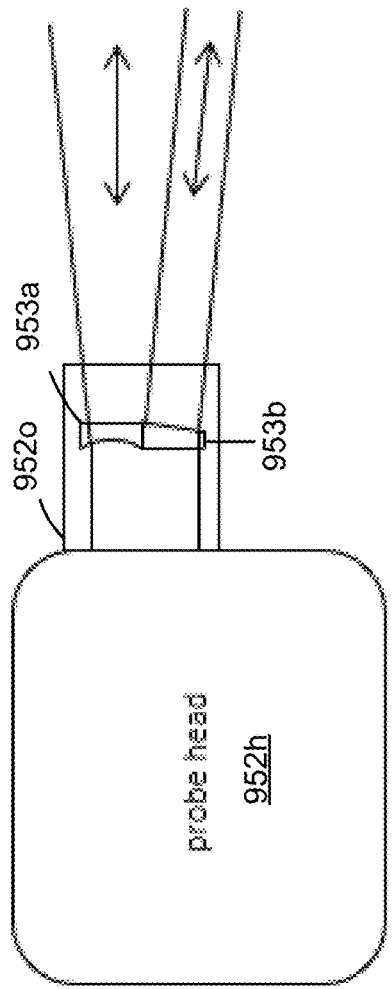
FIG. 6B illustrates an example embodiment of a probe head with a sample optic comprising a combination of different windows arranged in a parallel configuration.

Furthermore, in alternative embodiments, one or more axicon windows, one or more wedged windows, and/or one or more diverging windows may be used together in a series or parallel configuration, and may even be combined within the same optical element in a further alternative embodiment, such as a window that is concave on one surface and conical on the other surface. For example, as shown in FIG. 6A, diverging lens 903b and axicon lens 903a are shown in a series configuration. As another example, FIG. 6B shows wedged window 953b and diverging lens 953a in a parallel configuration.

Other alternative implementations instead of any of the wedged window(s) 203, diverging window(s) 303, or axicon window(s) 353 of FIGS. 3A, 3B and 3C, respectively, include using a window with (a) very poor surface flatness on one or both surfaces (such as surface variations of about 10 wavelengths or greater with respect to the collimated sample beam), (b) internal variations in the index of refraction (for instance changes in the index of refraction of about 0.01 or greater) or both (a) and (b), to mitigate the constructive and destructive interference of the collimated sample beam. However, these alternative embodiments may not be as preferable since such variations in surface flatness or index of refraction may be difficult to manufacture in a reproducible fashion.

Another potential problem with excitation via substantially collimated excitation beams and collection of collimated and/or afocal light beams scattered from the sample 110 when using conventional probes is that unwanted off-axis light rays may enter the probe head 102h and interfere with the spectroscopic measurement of the backscattered light from the sample 110. For example, with respect to FIG. 2, if the spectroscopic probe 102h is being used in a location with ambient background light, this background light may enter the probe system 102 through the sample optic 102o and be transmitted into the collection fiber 108. Non-shifted laser light reflecting from the sample 110 (via Rayleigh scattering) may also travel through the sample optic 102o and reach the dichroic filter and/or laser-blocking filters inside the probe head 102h. Since these filters only work properly for light that is received at the filter within a certain small range of incident angles, off-axis laser light can pass through the filters (instead of being absorbed or reflected like on-axis laser light) and generate spurious spectroscopic signals.

Figure 4A:
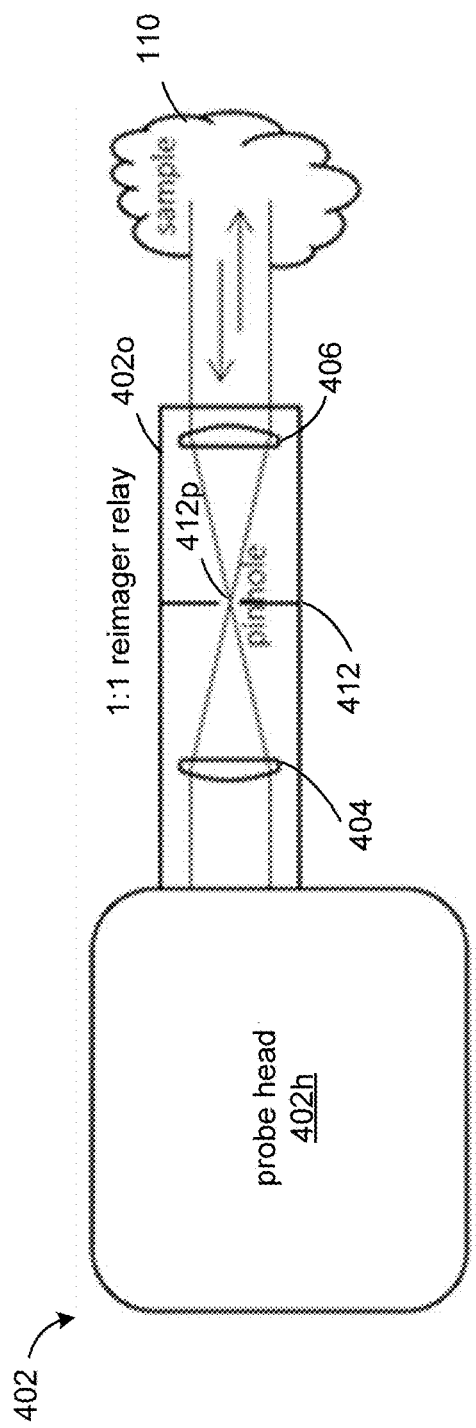
FIG. 4A illustrates an example embodiment of a probe head with a sample optic comprising a 1:1 optical reimager which transmits a collimated beam while preventing off-axis light from entering the probe head.

In another aspect, in accordance with the teachings herein, to help suppress off-axis light, an optical spectroscopy probe is provided with a sample optic comprising a reimager relay which focuses an incident collimated beam to an intermediate focal point, permits the beam to re-diverge following said intermediate focal point, and then recollimates the beam. For example, referring now to FIG. 4A, shown therein is an example embodiment of a probe head 402 having a sample optic 402o with a small physical pinhole 412p or other aperture at substantially the same location as an intermediate focal plane 412. Light which is on-axis to the reimager relay will be focused within the pinhole aperture 412p and will thus pass through, while off-axis light will be focused upon the opaque part of the pinhole aperture 412p and be absorbed or reflected such that it does not enter the probe head 402h. In a preferred embodiment, the material used to construct a wall with the pinhole aperture 412p may be a substance such as stainless steel or aluminum which does not generate a spectroscopic signal of its own, so that excitation light hitting the substance does not generate any spurious spectroscopic signals. This sort of optical arrangement with reimaging optical elements and a pinhole aperture can be referred to as a "spatial filter". A spatial filter has never previously been used in a spectroscopic probe to receive collimated beams incident upon a first surface of the spatial filter and to receive at least one of the substantially collimated afocal returning scattered light beams from the sample on a second surface of the spatial filter where the first and second surfaces are disposed opposite to one another.

In the example embodiment of FIG. 4A, the probe head 402h comprises a spatial filter positioned halfway between a first converging lens 404 located at a proximal portion of the sample optic 402o, the first converging lens 404 having a convex surface facing towards the probe head 402h and a second converging lens 406 at a distal portion of the sample optic 402o having a convex surface facing towards the sample 110 thereby implementing the reimager relay with a 1:1 ratio located within the sample optic 402o.

Figure 4B:
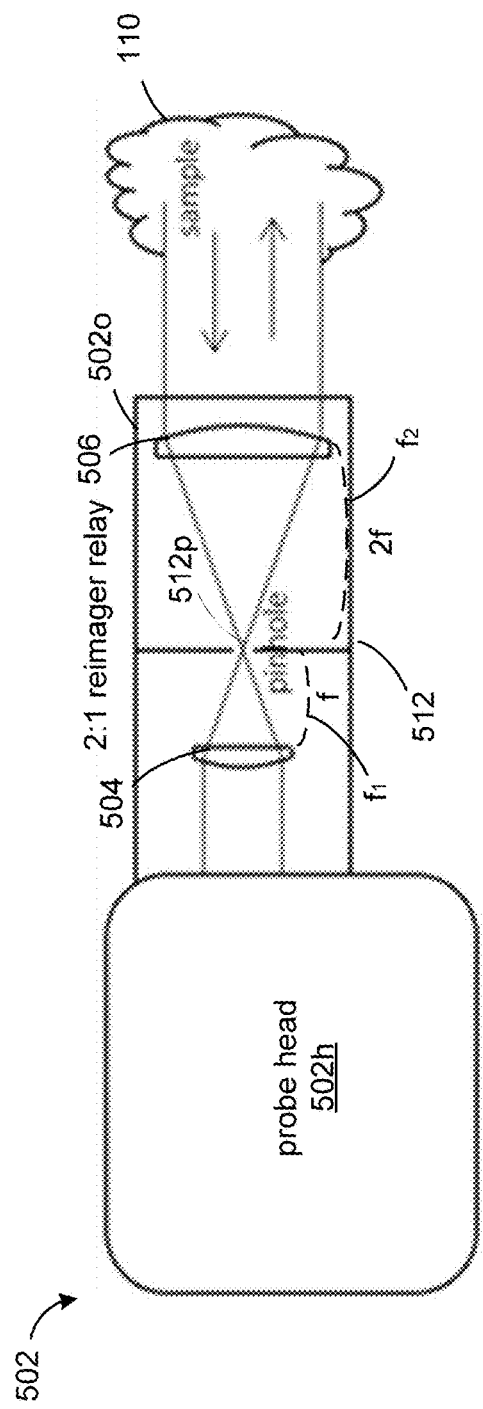
FIG. 4B illustrates an example embodiment of a probe head with a sample optic comprising a 2:1 optical reimager which transmits a collimated beam while preventing off-axis light from entering the probe head, and also expands the collimated excitation beam to measure a larger region of the sample as compared to the sample optic of the probe head of FIG. 4A.

However, in alternative embodiments, it may be advantageous to make the collimated beam larger or smaller at the location of the sample 110 by changing the focal lengths of the lenses or mirrors used in the reimager relay of the sample optic. For example, referring now to FIG. 4B, shown therein is an example embodiment of a probe 502 with a 2:1 reimager configuration located in the sample optic 502o. The 2:1 reimager configuration includes a first converging lens 504 with a focal length $f_1$ placed a distance f away from an intermediate focal plane 512, and a second converging lens 506 having a focal length $f_2$ that is 2f and is placed a distance 2f away from the intermediate focal plane 512. The second converging lens 506 is about two times larger than the first converging lens 504, and the 2:1 reimager relay thereby increases the size of the collimated excitation beam that is shone on the sample 110 by a factor of 2. In other embodiments, an X:1 reimager relay may be used where X is any number that is greater than zero.

Alternatively, in other embodiments, cylindrical or toroidal optical elements (either lenses, mirrors, or a combination of lenses and mirrors), one or more prisms, or other optical elements, can be used to also change, in addition to the reimaging effect described previously, the dimension of the collimated beams in an anamorphic fashion, such that the collimated excitation beam is larger along a first dimension than along the perpendicular dimension, and at least one of the substantially collimated afocal returning scattered light beams that is focused by the internal optics of the probe head on to the collection fiber is similarly larger along the same first dimension than along the perpendicular dimension. Examples of this include turning a circular collimated excitation beam (i.e. having a circular cross-section) into an elliptical collimated excitation beam (i.e. having an elliptical horizontal or vertical cross-section), or a square collimated excitation beam into a rectangular collimated excitation beam. For example, referring to FIG. 4B, if both converging lenses 504 and 506 in the sample optic 502o are changed from spherical lenses to cylindrical lenses, where each cylindrical lens has the same focal length as the spherical lens that it is replacing, and the pinhole 512p is replaced by a slit aperture, then the collimated excitation beam may exit the sample optic 502o towards the sample 110 with twice the height as the beam entering the sample optic 502O, but with the same width or vice versa (i.e. twice the width and the same height), depending on the rotational orientation of the two lenses. The beam's cross-sectional profile may then be matched to a specific format most suitable for a given sample or container dimensions, without redesigning or realigning the optical elements inside the probe head 502h, providing useful flexibility.

One other aspect of the reimager configuration, in accordance with the teachings herein, is that any gas located within the enclosure housing of the sample optic that contains the reimaging lenses, especially gas at the intermediate focal point (coinciding with the pinhole aperture location), may generate an additional spectroscopic signal in response to the excitation beam. In some cases, this additional spectroscopic signal may be useful for calibrating the spectroscopic measurement system.

By way of example, nitrogen gas ($N_2$) has a Raman peak at 2,331 cm$^{-1}$, a region of the Raman spectrum which is usually devoid of lines or bands. If the spectrometer can simultaneously collect data from this $N_2$ line in addition to Raman lines of the sample 110, the peak height and spectral position of this line can be used to verify that the power and wavelength of the excitation laser are remaining constant, or provide suitable information to correct for any such changes in the laser. Accordingly, in this case, the sample optic is contained within an enclosure that provides a sealed volume for the sample optical elements and contains at least one gas with spectral lines or bands in a spectrometer spectral range that can be used as a spectral calibration reference.

As another example, if Raman bands from atmospheric nitrogen or oxygen interfere with Raman bands of the sample 110, then the interior of the reimager enclosure (between the two lenses) may be hermetically sealed and filled with a spectroscopically inert gas such as argon, or even pumped out to form a vacuum, such that no spectroscopic signal is generated from within the sample optic section of the probe. Accordingly, in this case the sample optic is contained within an enclosure that provides a sealed volume for the sample optical elements and contains: (a) at least one gas with no spectral lines or bands in a spectrometer spectral range which might interfere with spectral measurement of the sample or (b) a low-density gas or an effective vacuum to prevent interference with spectral measurement of the sample 110.

It should be noted that the various example embodiments described herein generally employ unfocused collimated excitation beams to illuminate the sample 110 which means that the excitation beams have cross-sectional dimensions which are larger (e.g., about 1 mm to 100 mm or more in size) than a typical focused spot (e.g., normally about 1 micrometer to 1 mm in size). The larger size and collimated property of these excitation beams provides certain advantages for many types of Raman measurements such as, but not limited to, at least one of (1) avoiding concentration of a laser beam onto a small region of the sample 110, which can increase the possibility of damaging the sample 110 via laser heating, (2) measuring the sample 110 over a larger region which may be more representative of the whole sample 110, and (3) permitting the sample 110 to be positioned anywhere within a range of locations relative to the sample optic focal point without substantially changing the measured spectroscopic signal.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. An optical spectroscopy probe comprising:
a probe head having optical elements for coupling to an excitation fiber for receiving laser energy therefrom and generating a collimated excitation light beam; and
a sample optic adjacent to the probe head, the sample optic having at least one optical element with two non-parallel surfaces to receive the collimated excitation light beam, to transmit an afocal excitation light beam to a sample, and to collect at least one afocal returning scattered light beam that is reflected from the sample.

2. The probe of claim 1, wherein the at least one optical element comprises at least one wedged window that is disposed between the probe head and the sample and has two surfaces that are tilted with respect to one another to transmit a substantially collimated afocal excitation light beam to the sample and receive at least one substantially collimated afocal returning scattered light beam without inducing an interferometric fringing or etaloning pattern in a resulting spectrum that is generated from the at least one substantially collimated afocal returning scattered light beam that is reflected from the sample.

3. The probe of claim 2, wherein the at least one optical element comprises a plurality of wedged windows arranged in a serial or parallel configuration.

4. The probe of claim 1, wherein the at least one optical element comprises at least one diverging lens that is disposed between the probe head and the sample, the at least one optical element having one or more non-planar surfaces that are adapted to cause the collimated excitation light beam to diverge afocally during transmission to the sample and receive the at least one afocal returning scattered light beam thereby preventing an interferometric fringing/etaloning pattern in a resulting spectrum that is generated from the at least one afocal returning scattered light beam that is reflected from the sample.

5. The probe of claim 4, wherein the at least one optical element comprises a plurality of diverging lenses that are arranged in a serial or parallel configuration.

6. The probe of claim 1, wherein the at least one optical element comprises at least one axicon lens that is disposed between the probe head and the sample, the at least one axicon lens having one or more conical surfaces that are adapted to cause the collimated excitation light beam to converge afocally during transmission to the sample and receive the at least one afocal returning scattered light beam thereby preventing an interferometric fringing/etaloning pattern in a resulting spectrum that is generated from the at least one afocal returning scattered light beam that is reflected from the sample.

7. The probe of claim 6, wherein the at least one optical element comprises a plurality of axicon lenses arranged in a serial or parallel configuration.

8. The probe of claim 1, wherein the at least one optical element comprises a combination of at least two different optical elements, each of the at least two optical elements being one of a wedged window, a diverging lens, or an axicon lens, the at least two optical elements having one or more surfaces that are adapted to cause the collimated excitation light beam to transmit afocally to the sample and receive the at least one afocal returning scattered light beam thereby preventing an interferometric fringing/etaloning pattern in a resulting spectrum that is generated from the at least one afocal returning scattered light beam that is reflected from the sample.

9. The probe of claim 1, wherein the sample optic comprises a reimager having first and second optical elements disposed on either side of a spatial filter, the spatial filter being disposed at an intermediate focal point thereby preventing off-axis light from entering the probe head and contaminating a resulting spectrum that is generated from a substantially collimated afocal returning scattered light beam that is reflected from the sample.

10. The probe of claim 9, wherein the first and second optical elements are spaced apart from the spatial filter and have focal lengths to provide the reimager with a reimaging ratio of 1:1.

11. The probe of claim 9, wherein the first and second optical elements are spaced apart from the spatial filter and have focal lengths to provide the reimager with a reimaging ratio that is: (a) greater than 1:1 to increase a diameter of the afocal excitation beam at the sample or (b) smaller than 1:1 to decrease a diameter of the afocal excitation beam at the sample.

12. The probe of claim 9, wherein at least one of the first and second optical elements are lenses.

13. The probe of claim 9, wherein at least one of the first and second optical elements are cylindrical or toroidal lenses that are adapted to reshape the collimated excitation beam along one axis relative to a perpendicular axis.

14. The probe of claim 9, wherein at least one of the optical elements is a curved mirror, an anamorphic prism, or another optical element which acts as a lens and causes the collimated excitation beam to change shape, change direction, or to diverge or converge.

15. The probe of claim 9, wherein the sample optic is contained within an enclosure that provides a sealed volume for the sample optic and contains at least one gas with spectral lines or bands in a spectrometer spectral range for use as a spectral calibration reference.

16. The probe of claim 9, wherein the sample optic is contained within an enclosure that provides a sealed volume for the sample optic and contains at least one gas with no spectral lines or bands in a spectrometer spectral range to prevent interference with spectral measurement of the sample.

17. The probe of claim 9, wherein the sample optic is contained within an enclosure that provides a sealed volume for the sample optic, the sealed volume containing a gas at a density below standard atmospheric density to prevent interference with spectral measurement of the sample.

18. An optical spectroscopy probe comprising:
a probe head having optical elements for coupling to an excitation fiber for receiving laser energy therefrom and generating a collimated excitation light beam; and
a sample optic adjacent to the probe head, the sample optic having at least one optical element that is adapted to receive the collimated excitation light beam, to transmit an afocal excitation light beam to a sample, and to collect at least one afocal returning scattered light beam that is reflected from the sample, wherein the at least one optical element has two non-parallel surfaces that are arranged so that portions of the collimated excitation light beam or the at least one afocal returning scattered light beam that are internally reflected by both surfaces will be tilted at an angle or plurality of angles relative to the collimated excitation light beam or the at least one afocal returning scattered light beam, respectively.

* * * * *